(12) United States Patent
Benjebbour et al.

(10) Patent No.: US 8,014,464 B2
(45) Date of Patent: Sep. 6, 2011

(54) COMMUNICATION APPARATUS AND COMMUNICATION METHOD USED IN SPECTRUM SHARING ENVIRONMENT

(75) Inventors: Anass Benjebbour, Yokosuka (JP); Takahiro Asai, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 897 days.

(21) Appl. No.: 11/610,767

(22) Filed: Dec. 14, 2006

(65) Prior Publication Data
US 2007/0133712 A1     Jun. 14, 2007

(30) Foreign Application Priority Data
Dec. 14, 2005   (JP) .................................. 2005-360920

(51) Int. Cl.
    *H04L 27/00*    (2006.01)
(52) U.S. Cl. ........ 375/295; 375/135; 375/267; 375/278; 375/296; 375/302; 370/206; 370/230
(58) Field of Classification Search .................. 375/299, 375/306, 316, 342–345, 354, 359, 259, 260, 375/267, 327, 130, 135, 136, 148, 150, 220, 375/286, 295–297, 302, 315, 322, 340, 346
    See application file for complete search history.

(56) References Cited

U.S. PATENT DOCUMENTS

| | | | |
|---|---|---|---|
| 7,546,096 B2* | 6/2009 | Sorrells et al. ................ | 455/118 |
| 7,619,971 B1* | 11/2009 | Siva et al. ................... | 370/230.1 |
| 7,620,095 B2* | 11/2009 | Ben-Bassat ................... | 375/141 |
| 7,664,160 B2* | 2/2010 | Fujita et al. ................... | 375/130 |
| 2003/0185313 A1* | 10/2003 | Beaulieu ....................... | 375/295 |
| 2004/0086027 A1* | 5/2004 | Shattil ............................ | 375/146 |
| 2005/0141602 A1* | 6/2005 | Hyun et al. .................... | 375/219 |
| 2007/0133387 A1* | 6/2007 | Arslan et al. .................. | 370/206 |
| 2007/0183327 A1* | 8/2007 | Bellows ......................... | 370/230 |

FOREIGN PATENT DOCUMENTS

| | | |
|---|---|---|
| JP | 10-242931 | 9/1998 |
| JP | 2000-13342 | 1/2000 |
| WO | WO 2004/077775 A1 | 9/2004 |

OTHER PUBLICATIONS

William A. Gardner, "Exploitation of Spectral Redundancy in Cyclostationary Signals", IEEE Signal Processing Magazine, vol. 8, No. 2, pp. 14-36, Apr. 1991.
William A. Gardner, "Cyclic Wiener Filtering:Theory and Method", IEEE Transactions on Communications, vol. 41, No. 1, pp. 151-163, Jan. 1993.
Office Action issued Jan. 4, 2011, in Japan Patent Application No. 2005-360920 (with English translation).

* cited by examiner

*Primary Examiner* — Shuwang Liu
*Assistant Examiner* — Hirdepal Singh
(74) *Attorney, Agent, or Firm* — Oblon, Spivak, McClelland, Maier & Neustadt, L.L.P.

(57) ABSTRACT

A communication apparatus used in a spectrum sharing environment in which multiple communication systems coexist using the same spectrum band is provided. The apparatus includes a transmission pulse shaper that performs bandwidth limitation on a pulse which is used to send data symbols; a monitoring unit that monitors in-band interference conditions from coexisting systems other than a target system to which the communication apparatus belongs, and availability of unused spectrum on adjacent channels of the target system; a controller that controls a pulse transmission period and a pulse width of the transmission pulse shaper based on the monitoring result; and a transmission unit that transmits the band-limited signal.

5 Claims, 19 Drawing Sheets

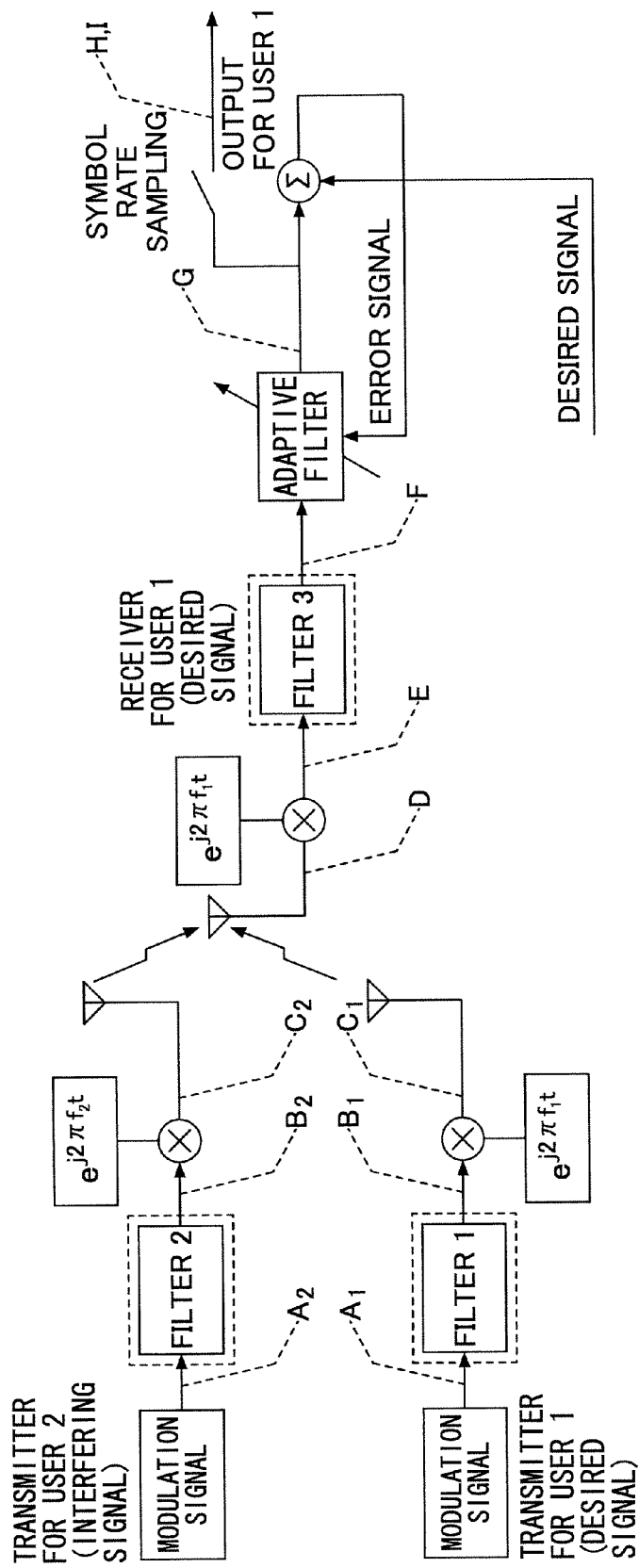

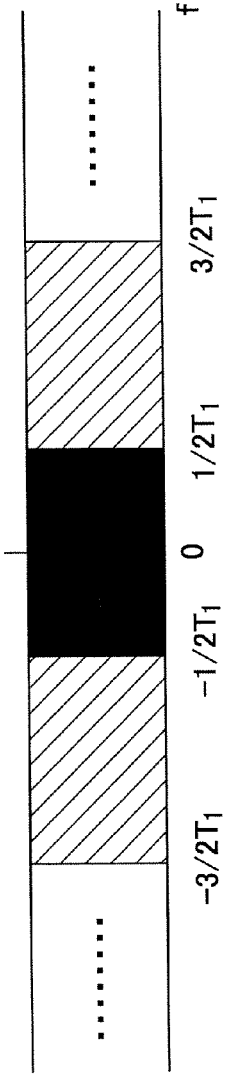
FIG.2A  SIGNAL A1: MODULATED BASEBAND SIGNAL (FREQUENCY SPECTRUM) OF IMPULSE SEQUENCE OF USER 1
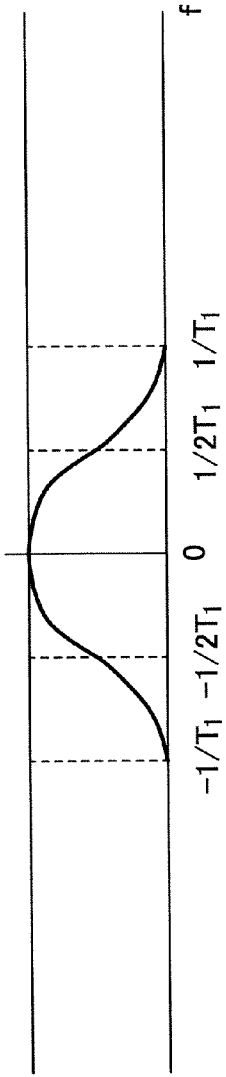
FIG.2B  SIGNAL B1: FREQUENCY SPECTRUM OF BAND-LIMITED BASEBAND SIGNAL OF USER 1 OUTPUT FROM ROOT-RAISED COSINE FILTER
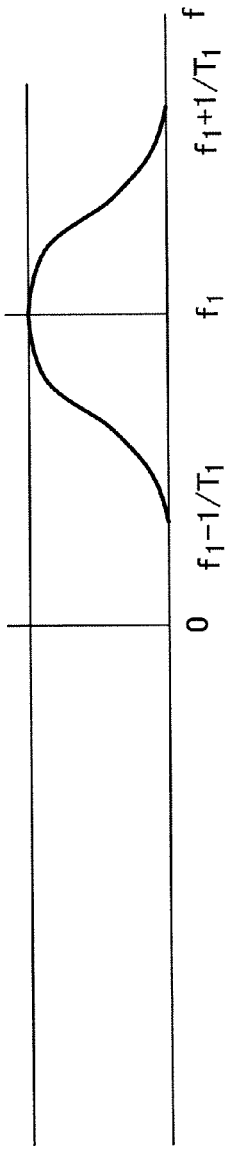
FIG.2C  SIGNAL C1: FREQUENCY SPECTRUM OF RF TRANSMISSION SIGNAL OF USER 1

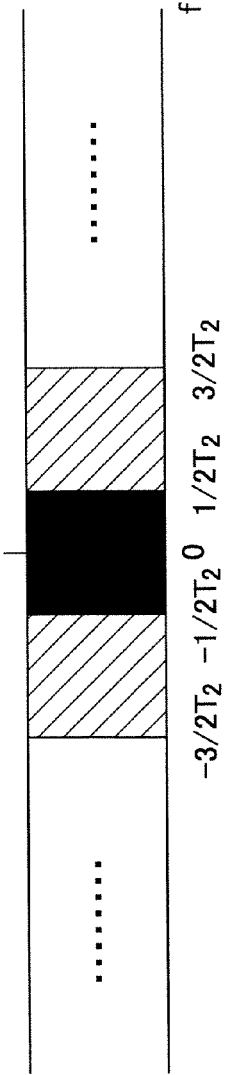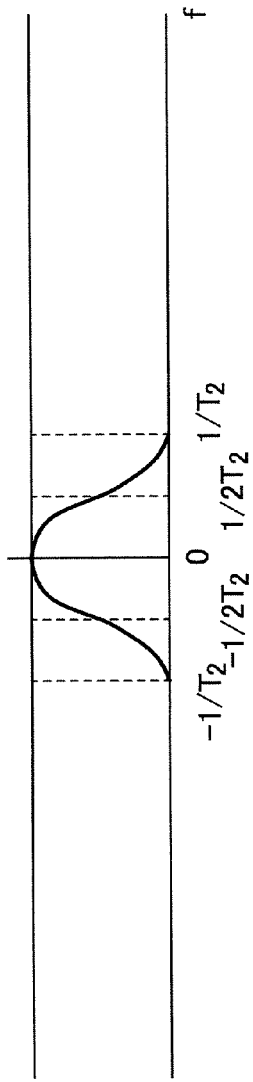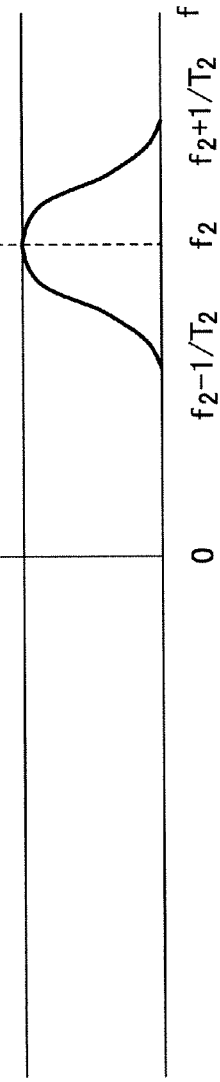
FIG.3A SIGNAL A2: MODULATED BASEBAND SIGNAL (FREQUENCY SPECTRUM) OF IMPULSE SEQUENCE OF USER 2
FIG.3B SIGNAL B2: FREQUENCY SPECTRUM OF BAND-LIMITED BASEBAND SIGNAL OF USER 2 OUTPUT FROM ROOT-RAISED COSINE FILTER
FIG.3C SIGNAL C2: FREQUENCY SPECTRUM OF RF TRANSMISSION SIGNAL OF USER 2

SIGNAL D: RECEIVED SIGNAL

SIGNAL E: RF-TO-BASEBAND FREQUENCY-CONVERTED RECEIVED SIGNAL

SIGNAL F: BAND-LIMITED RECEIVED SIGNAL OUTPUT FROM USER 1 RECEIVE FILTER

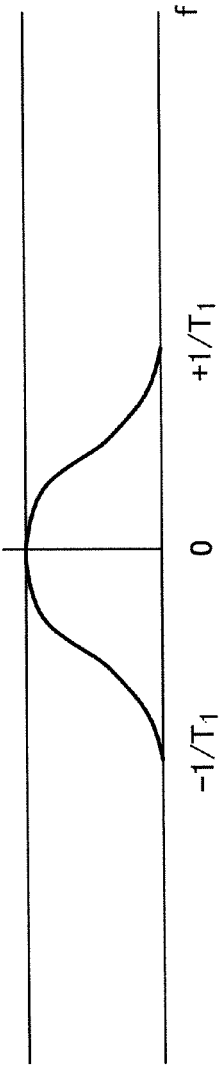
FIG.5A
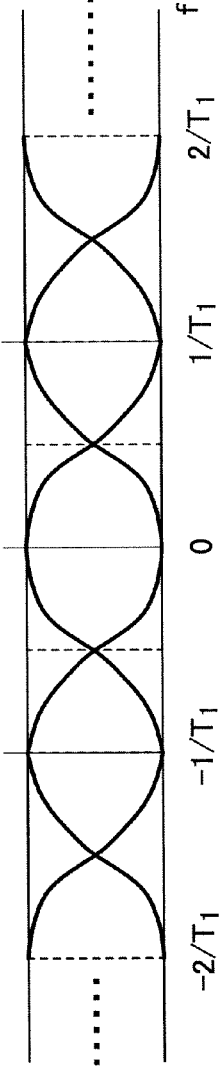
FIG.5B
FIG.5C

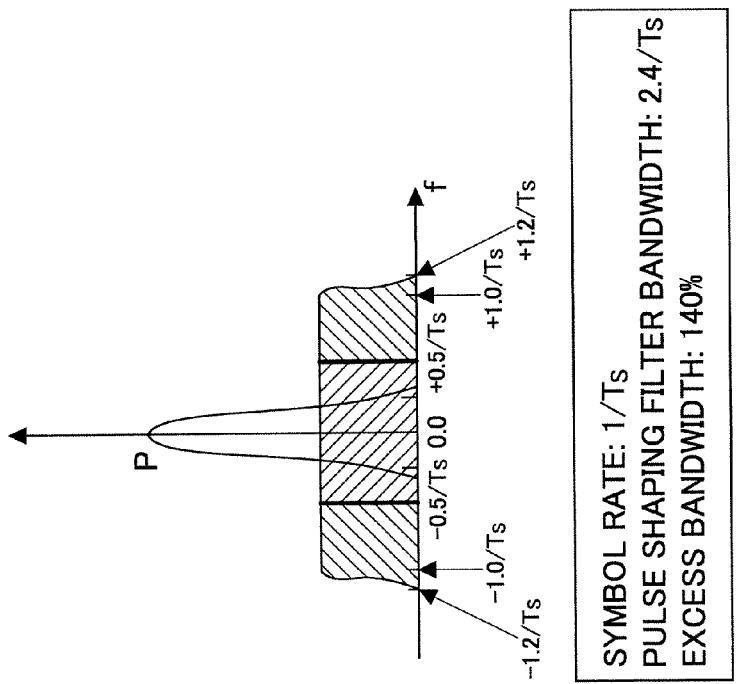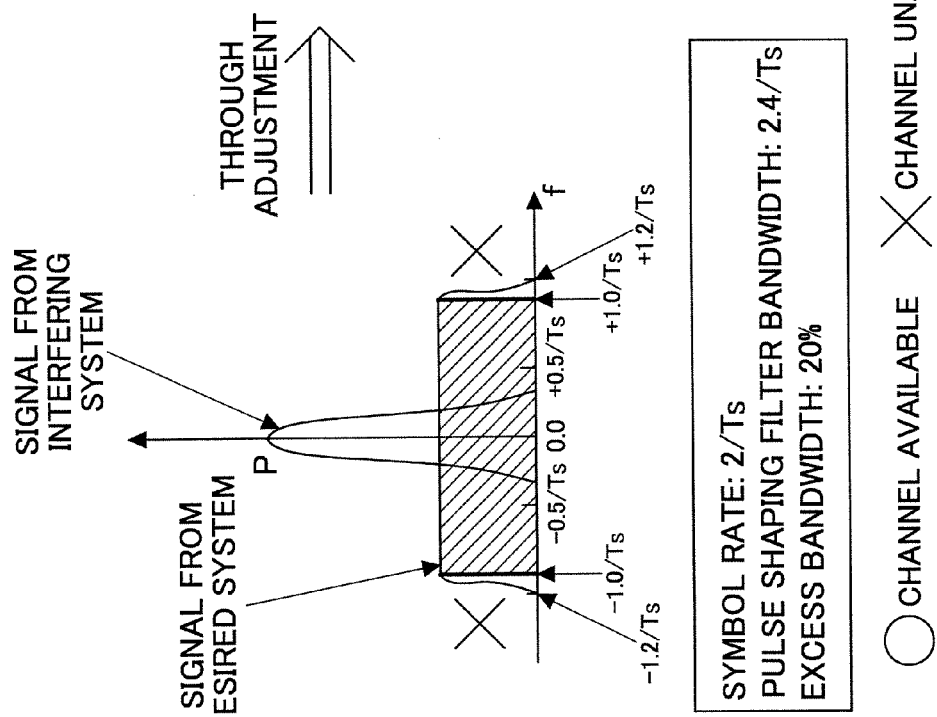
FIG.15

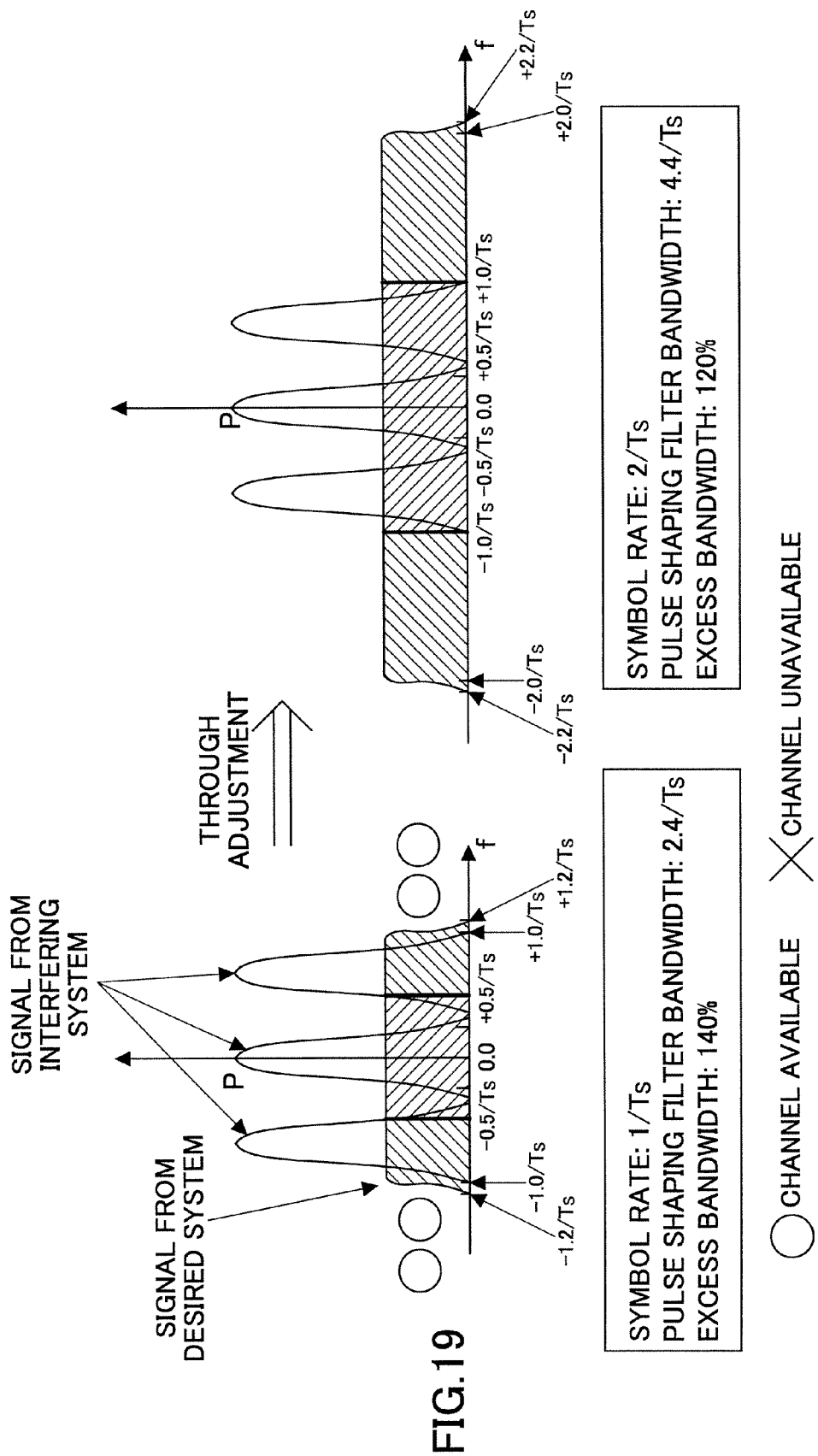

COMMUNICATION APPARATUS AND COMMUNICATION METHOD USED IN SPECTRUM SHARING ENVIRONMENT

FIELD OF THE INVENTION

The present invention generally relates to a wireless communication technique, and more particularly, to a communication apparatus and method used in spectrum sharing environment in which multiple systems coexist and operate independently using the same spectrum band

BACKGROUND OF THE INVENTION

With conventional techniques, a dedicated frequency band is allocated to each of multiple wireless communication systems to avoid interference between them and maintain the signal quality. In recent years and continuing, however, studies and research have been conducted of sharing the same frequency band among multiple systems for the purpose of more efficient use of frequency resources. It is necessary for such a system to prevent interference from the other coexisting networks and maintain the signal quality of desired signals at each of the networks.

FIG. 1 is a schematic diagram illustrating signal transmission between transmitters and a receiver used in a spectrum sharing environment. In the figure, two wireless communication systems coexist in and share the same spectrum band. User 1 and user 2 belong to different communication systems. The signal transmitted from user 2 is an interfering signal for user 1. With a conventional wireless communication system, the transmission-side filter 1 and the receiving-side filter 3 are paired with each other, and the transmission characteristics of the filters are fixed so as to achieve appropriate band limitation.

FIG. 2 through FIG. 5 illustrate how the signals are processed at the transmitters and the receiver in the conventional system. Signals A1, A2, . . . , H, and I illustrated in FIG. 2 through FIG. 5 correspond to the signals indicated by the same symbols in FIG. 1.

FIG. 2A illustrates a modulated baseband signal (frequency spectrum) A1 of an impulse sequence generated for user 1, FIG. 2B illustrates a band-limited frequency spectrum B1 having passed through the root-raised cosine filter, and FIG. 2C illustrates frequency spectrum C1 of the RF signal to be transmitted for user 1. Carrier frequency f1 is used to transmit the desired signal for user 1. The signal is transmitted over a symbol period $T_1$, with the Nyquist bandwidth of $1/T_1$. The Nyquist bandwidth of the desired signal that satisfies symbol rate $1/T_1$ is between negative $½T_1$ and positive $½T_1$.

FIG. 3A illustrates a modulated baseband signal (frequency spectrum) A2 of an impulse sequence generated for user 2, FIG. 2B illustrates a band-limited frequency spectrum 32 having passed through the root-raised cosine filter, and FIG. 2C illustrates frequency spectrum C2 of the RF signal to be transmitted for user 2. Carrier frequency f2 is used to transmit the desired signal for user 2. The signal is transmitted over a symbol period $T_2$, with the Nyquist bandwidth of $1/T_2$. The Nyquist bandwidth of the desired signal that satisfies symbol rate $1/T_2$ is between negative $½T_2$ and positive $½T_2$.

FIG. 4A illustrates signal spectrum D received at the receiver of user 1, which spectrum contains (1) a desired signal component, (2) an undesired (interfering) signal component, and (3) a noise component. The combination of the components (1), (2), and (3) defines the total spectrum of the received signal. FIG. 4B illustrates a frequency-converted spectrum E obtained through frequency conversion from the RF frequency to the baseband frequency at the receiver of user 1. FIG. 4C illustrates a band-limited spectrum F having passed through the receiving filter 3 of the user 1 receiver.

FIG. 5A illustrates an ideally equalized desired signal output from the adaptive filter at the user 1 receiver. By performing symbol rate sampling on the equalized signal G, spectrum H appears on the frequency axis, as illustrated in FIG. 5B. Spectrum H is a repetition of spectrum G of FIG. 5A, appearing at the multiples of $1/T_1$. FIG. 5C illustrates output data (or restored transmission signal) I for user 1 obtained by combining individual spectra H.

One method for reducing interference from other systems is to transmit and receive communication parameters to and from other systems such that each system can prevent interference from other systems. This method, however, is not always available, and interfering signals from other systems cannot be sufficiently reduced when, for example, the communication parameters of other systems are unknown, the carrier frequency of the interference signal is dynamically changing (due to frequency hopping or other factors), or transmission of communication parameters itself is difficult between different systems.

The above-described conventional method for reducing interference from other systems employs maximum likelihood sequence estimation or linear equalization based on recursive processing. Such a method, however, requires each system to know information about parameters (such as modulation schemes, training symbols, or symbol rates) of other systems in advance. Accordingly, if parameters of other systems are unknown for some reason, this method cannot work efficiently.

Another method for removing interfering signals of other systems is to use a fractionally spaced equalizing (FSE) filter or a frequency shift (FRESH) filter. FIG. 6 is a schematic diagram of a FRESH filter, and FIG. 7 is a schematic diagram of an FSE filter. The FSE and the FRESH filters can be used as the adaptive filter shown in FIG. 1. As illustrated in FIG. 6, a FRESH filter includes parallel-connected FSE filters, the outputs of which filters are combined and subtracted from a training signal to produce an error signal. The filter coefficient of each of the FSE filters is adjusted so as to minimize the error signal. Each FSE filter has a series of delay elements for delaying the oversampled input signal, as illustrated in FIG. 7. The outputs of the delay elements are multiplied by the associated coefficients (or weighting factors) $c_i$, respectively, and combined together. The weighing factors are called tap coefficients. Details of FRESH and FSE are described in, for example, W. A. Gardner, "Exploitation of spectral redundancy in cyclostationary signals", IEEE Signal Processing Magazine, vol. 8, no. 2, pp. 14-36, April 1991, and W. A. Gardner, "Cyclic Wiener filtering: theory and method", IEEE Trans. Commun., vol. 41, no. 1, pp. 151-163, January 1993.

With the above-described conventional techniques, the characteristics of transmission filter 1 and receive filter 3 shown in FIG. 1 are fixed by system design so as to define a paired matched filter, while dynamic compensation, such as compensation for channel fluctuation, is assigned solely to the adaptive filter. It is therefore of concern that interference removing ability is insufficient, depending on the interfering conditions. In particular, as the carrier frequency of the desired signal and that of the undesired signal become closer to each other with the parameters of the undesired signals unknown, prevention of interference becomes more difficult.

By the way, the characteristic of a pulse shaping filter (filter 1, 2 or 3 shown in FIG. 1) is defined by a pulse transmission period and a pulse width. The pulse transmission period (Ts) is in inverse proportion to the symbol rate (i.e., the Nyquist bandwidth) expressed as 1/Ts. The pulse width is inversely proportional to the bandwidth of the pulse shaping filter. As illustrate in FIG. 8, the bandwidth of a pulse shaping filter is defined as the Nyquist bandwidth and the excess bandwidth, and the Nyquist bandwidth is defined as symbol rate 1/Ts. The excess bandwidth is a subtraction of the Nyquist bandwidth from the bandwidth of the pulse shaping filter. The excess bandwidth is expressed as a percentage with respect to the Nyquist bandwidth. For example, if the bandwidth of the pulse shaping filter and the Nyquist bandwidth are 2.4/Ts and 1/Ts, respectively, the excess bandwidth is 140%, as illustrated at the left-hand side of FIG. 8. If the Nyquist bandwidth is 2/Ts, then the excess bandwidth is 20%, as illustrated at the right-hand side of FIG. 8. If the Nyquist bandwidth is broad, the data transmission amount can be increased. Accordingly, the excess bandwidth is fixed to be narrow in general; however, with a narrow excess bandwidth, the interference capability of the FRESH and the FSE filters for removing in-band interference is also small.

In addition, presence of the in-band interference signal in the desired signal bandwidth and the availability of adjacent channels of the desired signal change with time depending on the traffic, and therefore the interference removing ability of each system also changes depending on the traffic. It is accordingly of concern that the interference cannot be removed sufficiently and the throughput may be degraded rapidly, depending on the conditions.

SUMMARY OF THE INVENTION

The present invention was conceived to overcome at least one of the aforementioned problems and aims to provide a method and an apparatus that can reduce degradation of signal receiving characteristics of a communication system and improve the throughput, even if the parameters of interfering signals of other systems are unknown, under a frequency sharing scheme in which multiple systems share the same frequency band to independently conduct wireless communications.

The communication apparatus provided by an embodiment of the present invention is used in a spectrum sharing environment in which multiple communication systems coexist and operate independently of each other using the same spectrum band. The communication apparatus includes a transmission pulse shaping unit that band-limits a pulse, a monitoring unit that monitors the in-band interference condition due to the coexisting systems other than the target system to which the communication apparatus belongs, as well as the adjacent channel availability for the target system, a controller that controls the pulse transmission period and the pulse widths of the transmission pulse shaping unit, and a transmission unit that transmits the band-limited signal.

With this structure, the in-band interference conditions and the availability of adjacent channels are monitored in the spectrum sharing environment. The monitoring result is used to adjust the bandwidth and the symbol rate of the pulse shaping filter of the target system, and consequently, to adjust the excess bandwidth. This structure can prevent the throughput of the target system from degrading even if the parameters of the interfering signals of the other coexisting systems are unknown.

According to a preferred example, the bandwidth and/or the symbol rate of the pulse shaping filter are adjusted in an adaptive manner according to the in-band interference condition and the availability of adjacent channels in order to control the excess bandwidth of the target system so as to improve the throughput. When the excess bandwidth is small, while the Nyquist bandwidth is broad, the bandwidth utilization efficiency is good. However, once in-band interference from other systems has occurred, the throughput is greatly degraded. The communication apparatus of this invention can overcome this problem by adjusting the excess bandwidth in an adaptive manner.

In a preferred example, when the channel condition is degraded, the excess bandwidth is broadened and interference is removed using an FSE filter and a FRESH filer. By adjusting the symbol rate and/or the bandwidth of the pulse shaping filter, the excess bandwidth can be regulated. For example, if adjacent channels are available when the throughput has fallen, the bandwidth of the pulse shaping filter is expanded toward the available channel to increase the excess bandwidth, while maintaining the current symbol rate, to improve the interference removing ability. This arrangement can restore the throughput without decreasing the symbol rate. If adjacent channels are not available, then the symbol rate is decreased to narrow the Nyquist bandwidth to increase the excess bandwidth in a relative manner. If, for example, the symbol rate is decreased from 2/Ts to half that rate, the excess bandwidth increases by 1/Ts. By broadening the excess bandwidth intentionally, the interference removing ability of the target system can be improved and the throughput of the system can be increased. Instead of adjusting one of the symbol rate and the bandwidth of the pulse shaping filter, both parameters may be adjusted.

According to another example, the transmission filter and the receive filter are adjusted in an adaptive manner according to the in-band interference condition so as to maintain the interference removing ability of the receiver high. In this case, the communication apparatus includes two or more filters with different center frequencies of the transmission characteristics, and an adjusting unit that adjusts the filter coefficients of at least one of the filters in an adaptive manner based on the filter outputs and known signals. The transmission characteristic center frequencies of the filters may be separated by the Nyquist bandwidth (or the cycle frequency) from the reference filter. The outputs from the filters with the center frequencies offset by the cycle frequency have great correlation. The filter coefficients are updated in an adaptive manner so as to increase the correlation value (i.e., so as to minimize the difference from the known signals), and consequently, a received signal with reduced interference can be acquired.

BRIEF DESCRIPTION OF THE DRAWINGS

Other features and advantages of the invention will become more apparent from the following detailed description when read in conjunction with the accompanying drawings, in which FIG. 1 is a schematic diagram of transmitters and a receiver used in a spectrum sharing environment;

FIG. 2A through FIG. 2C illustrate frequency spectra of the desired signals;

FIG. 3A through FIG. 3C illustrate frequency spectra of the undesired signals;

FIG. 5A through FIG. 5C are frequency spectra of the ideally equalized desired signals;

FIG. 15 illustrates how the excess bandwidth is adjusted when adjacent channels are unavailable;

FIG. 19 illustrates adjustment of the excess bandwidth by changing both the symbol rate and the pulse shaping bandwidth.

DETAILED DESCRIPTION OF THE PREFERRED EMBODIMENT

The preferred embodiment of the present invention is described below in conjunction with the attached drawings.
(Operations on Transmission Side)

Figure 9:
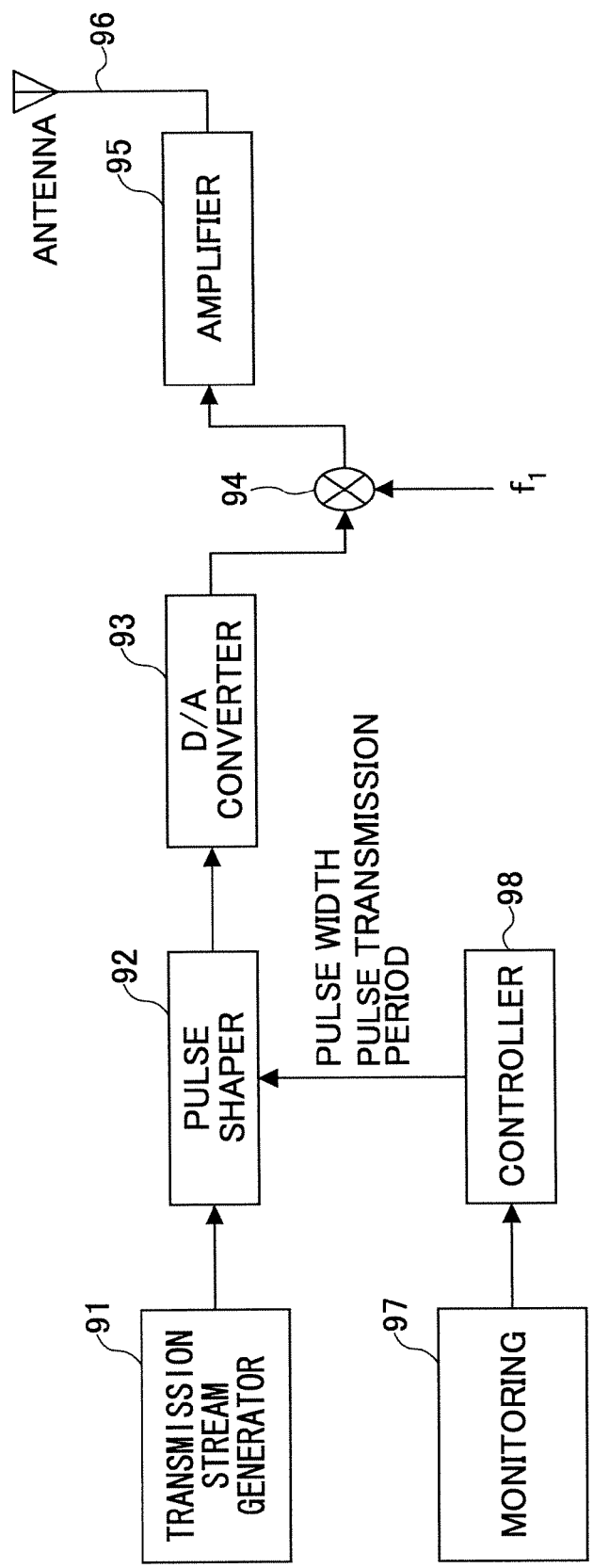
FIG. 9 is a block diagram of a transmitter according to an embodiment of the invention.

FIG. 9 is a block diagram of a transmitter of a communication apparatus used in an embodiment of the present invention. The transmitter includes a transmission stream generator 91, a pulse shaper 92, a digital-to-analog (D/A) converter 93, a mixer 94, an amplifier 95, an antenna 96, a monitoring unit 97, and a controller 98. The transmission stream generator 91 generates a data stream for the baseband transmission signal shown in FIG. 2A. The pulse shaper 92 band-limits the transmission signal, and to this end, it may be called a pulse shaping filter. To be more precise, the pulse shaper 92 carries out band limitation on the input data stream, and outputs the data at the selected pulse width and pulse transmission period. The characteristic of the pulse shaper (pulse shaping filter) 92 is controlled by the controller 98. As has been described above, the pulse width is in inverse proportion to the bandwidth of the pulse shaping filter 92, and the pulse transmission period is in inverse proportion to the symbol rate. The digital-to-analog converter 93 converts the digital baseband signal to an analog signal. The mixer 94 performs frequency conversion using a carrier frequency f1 of the desired signal. The amplifier 95 amplifies the power level of the signal so as to be transmitted from the antenna 96.

The monitoring unit 97 monitors the frequency spectrum and the power level of the interfering signal contained in the desired spectrum (of the target system), and in addition, it monitors availability of adjacent frequencies (channels), which can be monitored by measurement of the frequency spectra and the power levels. The in-band interference conditions and the adjacent channel availability may be monitored by scanning a wide range of spectra or other suitable methods.

The controller 98 determines the pulse transmission period (or the symbol rate) and the pulse width (or the pulse shaping bandwidth) used in the pulse shaping filter 92, and reports the determined values to the pulse shaping filter 92. When bandwidth limitation is performed on both transmission side and receiving side during communications, the band-limiting information of the transmission side is reported to the pulse shaping filter 92. The band-limiting information of the receiving side is transmitted to the counterpart communication equipment through, for example, a control. When the spectrum scanning is performed, bandwidth limitation is carried out according to the spectrum width.

Figure 10:
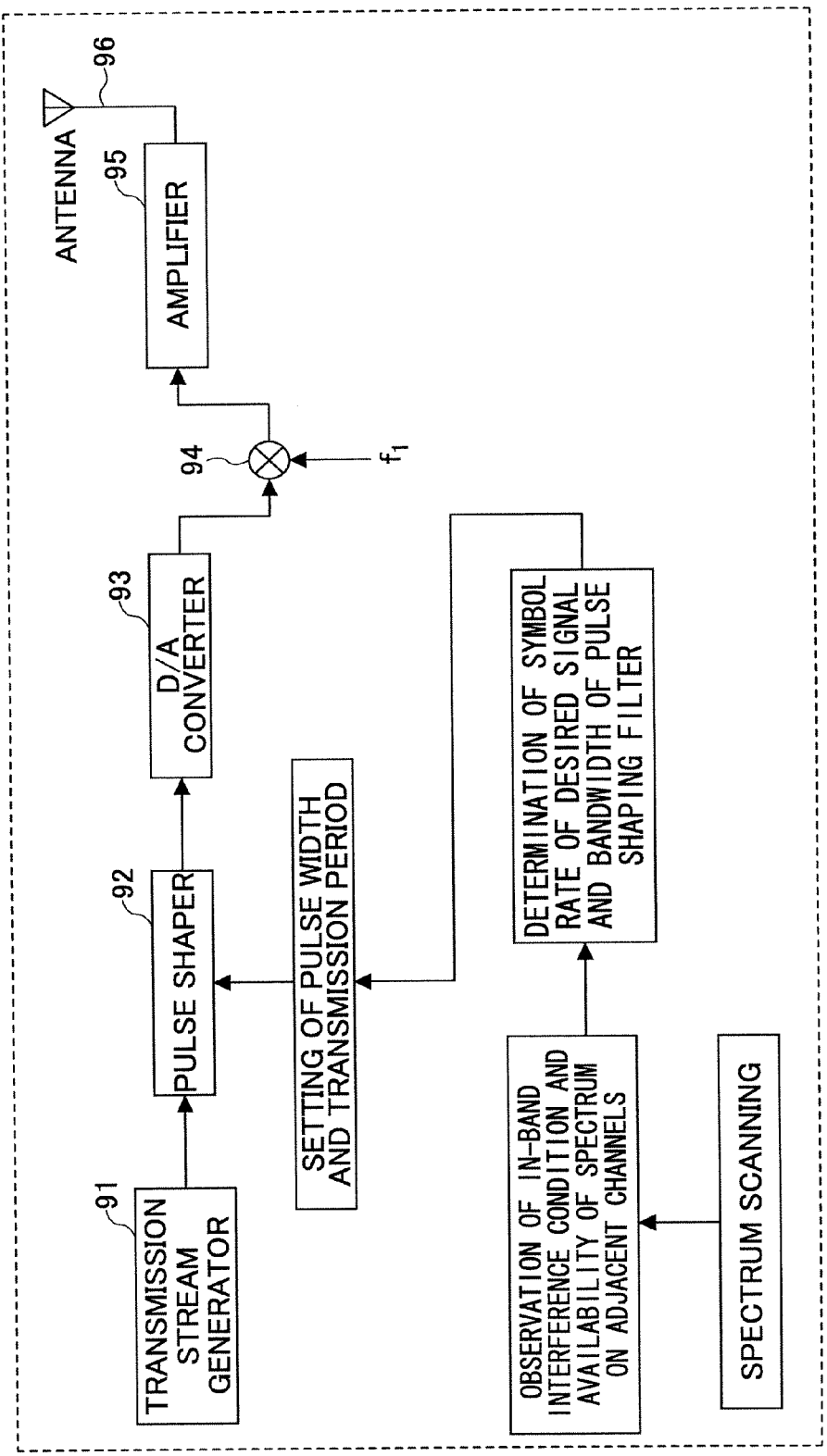
FIG. 10 is a diagram showing the structure and the functions of the transmitter.
Figure 11:
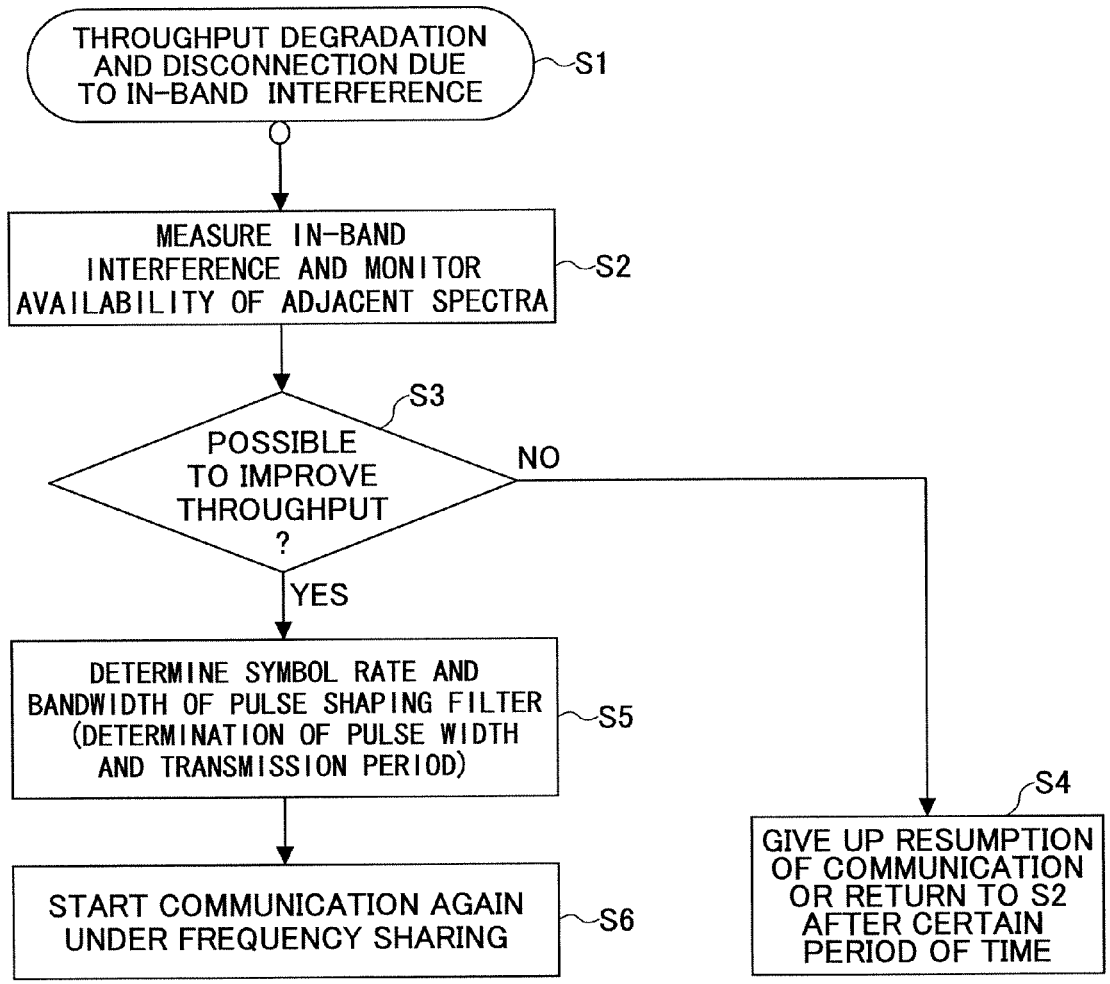
FIG. 11 is a flowchart showing the operations carried out at the transmitter.

FIG. 10 and FIG. 11 illustrate the operations flow of the transmitter. In particular, FIG. 10 illustrates determination of parameters of the pulse shaper 92 based on the measurement of the in-band interference condition and the availability of adjacent channels. Such parameters include at least pulse width and pulse transmission period. FIG. 11 is a flowchart showing the operations performed by the transmitter.

In step S1, disconnection has occurred at a mobile station (or a base station) during wireless communications due to increased interfering signals. The system to which the mobile station (or the base station) belongs is called a target system or a desired system, and the coexisting systems sharing the same frequency band with the desired system are called other systems for the sake of convenience. Although explanation is made using an example of a disconnected case, the present invention can be applicable to various situations needing prevention or reduction of interference.

It is conceivable that another channel be used to resume communications under the interfered situation. With such a method, however, the communication frequency has to be changed dynamically whenever the center frequency of the interfering signal is changing dynamically. This method accordingly imposes excessive workload on the system. In addition, even though the interference may be avoided by changing the communication frequency of the target system, a guard band has to be inserted between adjacent frequency bands (channels), and therefore, this method is unsuitable from the viewpoint of efficient use of frequencies.

In step S2, the in-band interference conditions and availability of adjacent channels are monitored by the monitoring unit 97. For example, the transmitter (the monitoring unit 97) suspends signal transmission temporarily to measure the intensity, frequency, and other parameters of the interfering signals from other systems when monitoring the in-band interference conditions and the adjacent channel availability.

In step S3, the controller 98 determines whether the interference can be reduced to improve the throughput based on the in-band interference conditions and the adjacent channel availability. If the determination result is negative (NO in S3), the process proceeds to step S4, in which step some measure, such as termination of signal transmission, returning to step S2 after a prescribed period of time, or requesting other systems to stop transmission of interfering signals, is taken. If the determination result of step S3 is affirmative (YES in S3), then the process proceeds to step S5.

In step S5, the determined parameters (including the pulse width and the pulse transmission period) are supplied to the pulse shaper 92.

In step S6, the band-limited signal output from the updated pulse shaper 92 is transmitted to start communications again.
(Operations on Receiving Side)

Figure 4A:
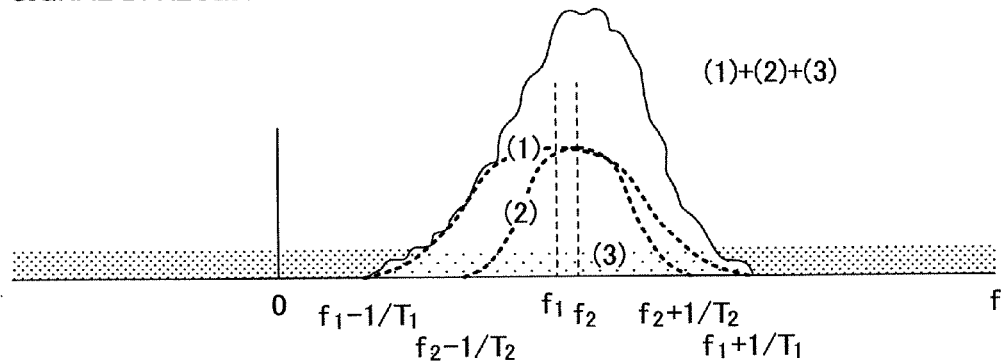
FIG. 4A through FIG. 4C illustrate frequency spectra of the received signals.
Figure 4B:
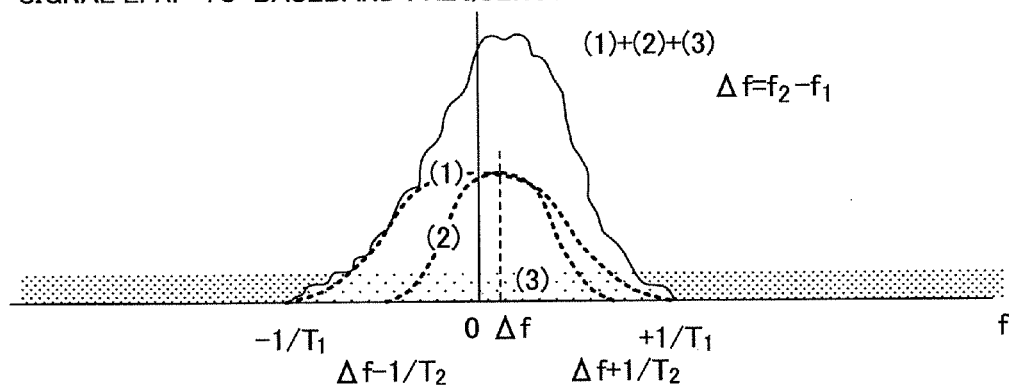
Figure 4C:
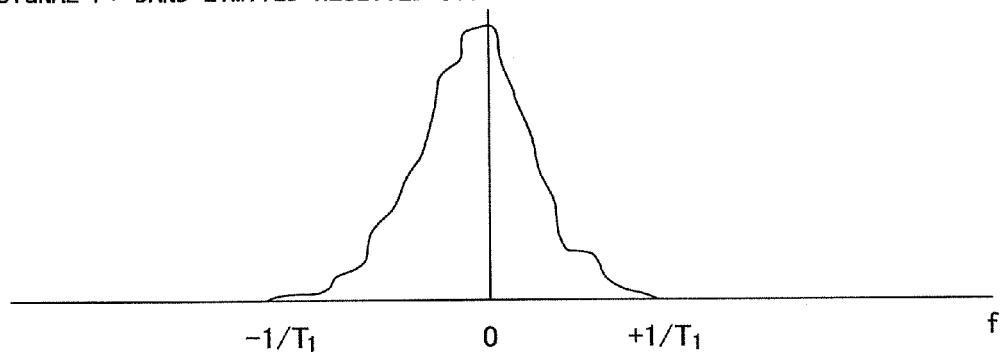
Figure 6:
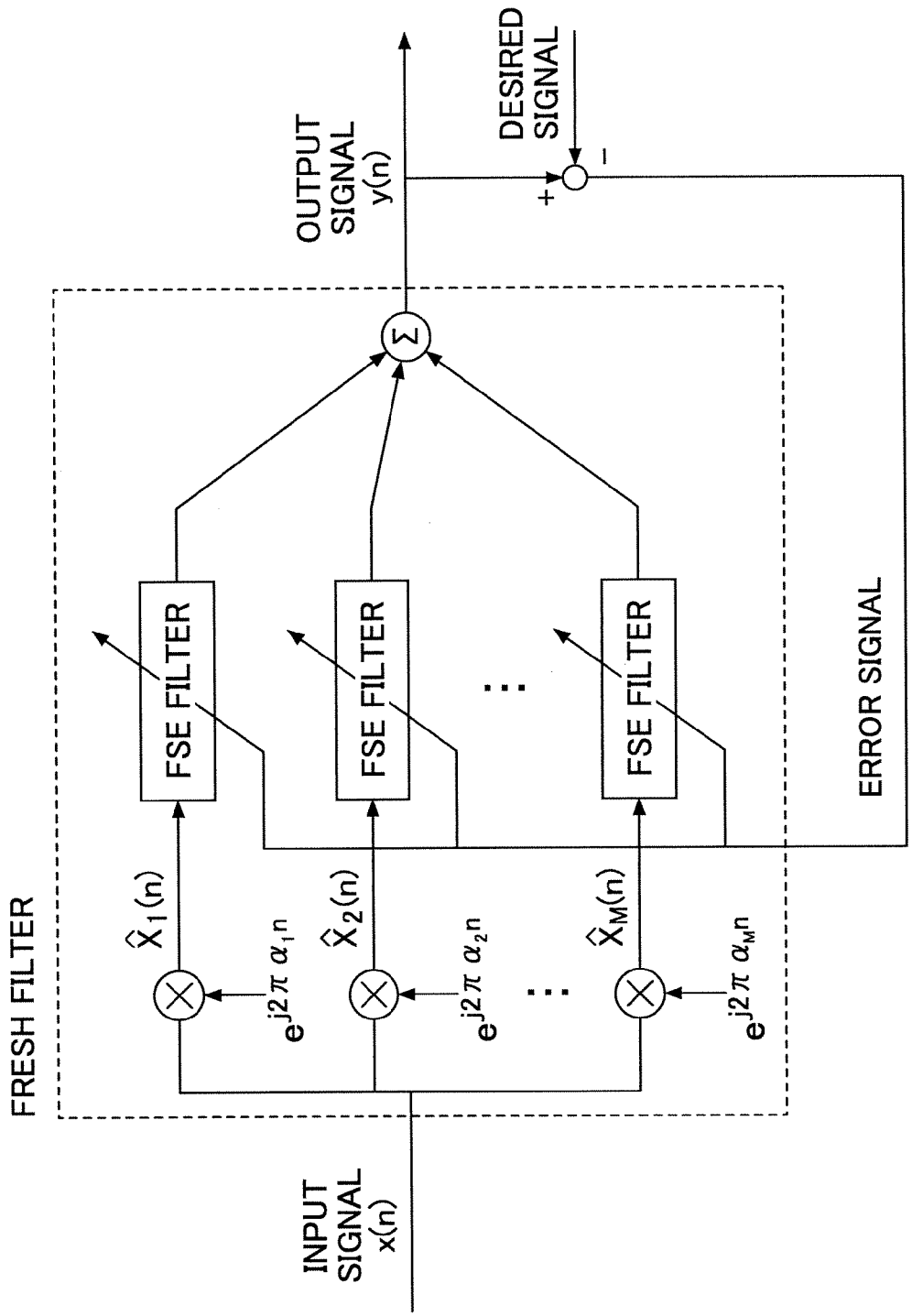
FIG. 6 is a schematic block diagram illustrating the basic structure of a frequency shift (FRESH) filter.

The transmitted signal is received at a receiver, and appropriate bandwidth limitation and interference removal are performed on the received signal to restore the transmission signal. The receiver is equipped with a frequency shift (FRESH) filter illustrated in FIG. 6. In the embodiment, the frequency shift filter serves as an adaptive filter. The receiver can reduce interference from other systems by making use of appropriately selected excess bandwidth. In other words, interfering signals can be reduced efficiently making use of the excess bandwidth of a desired signal, the details of which are described below.

Figure 7:
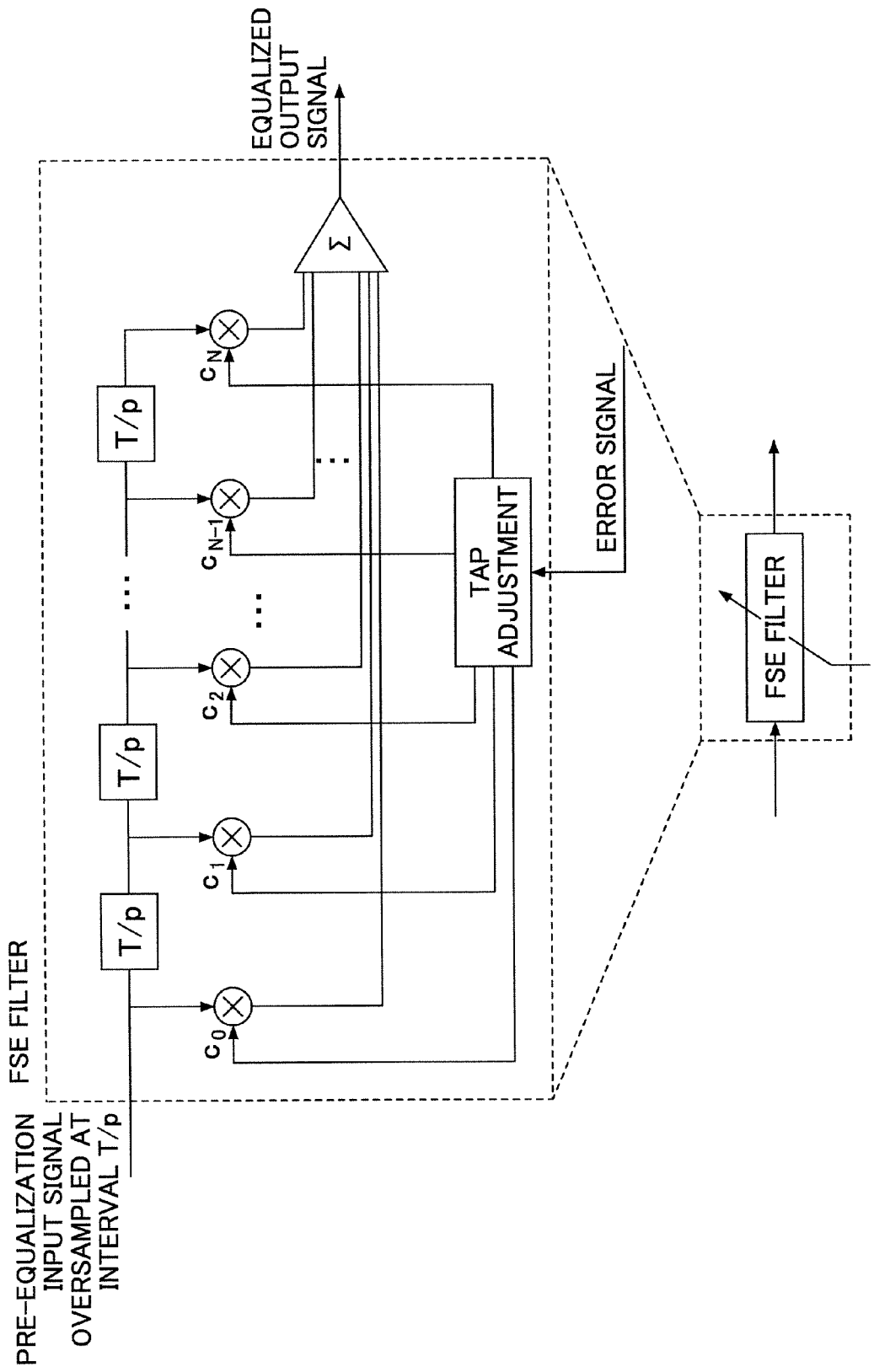
FIG. 7 is a schematic block diagram illustrating the basic structure of a fractionally spaced equalizing (FSE) filter.
Figure 12:
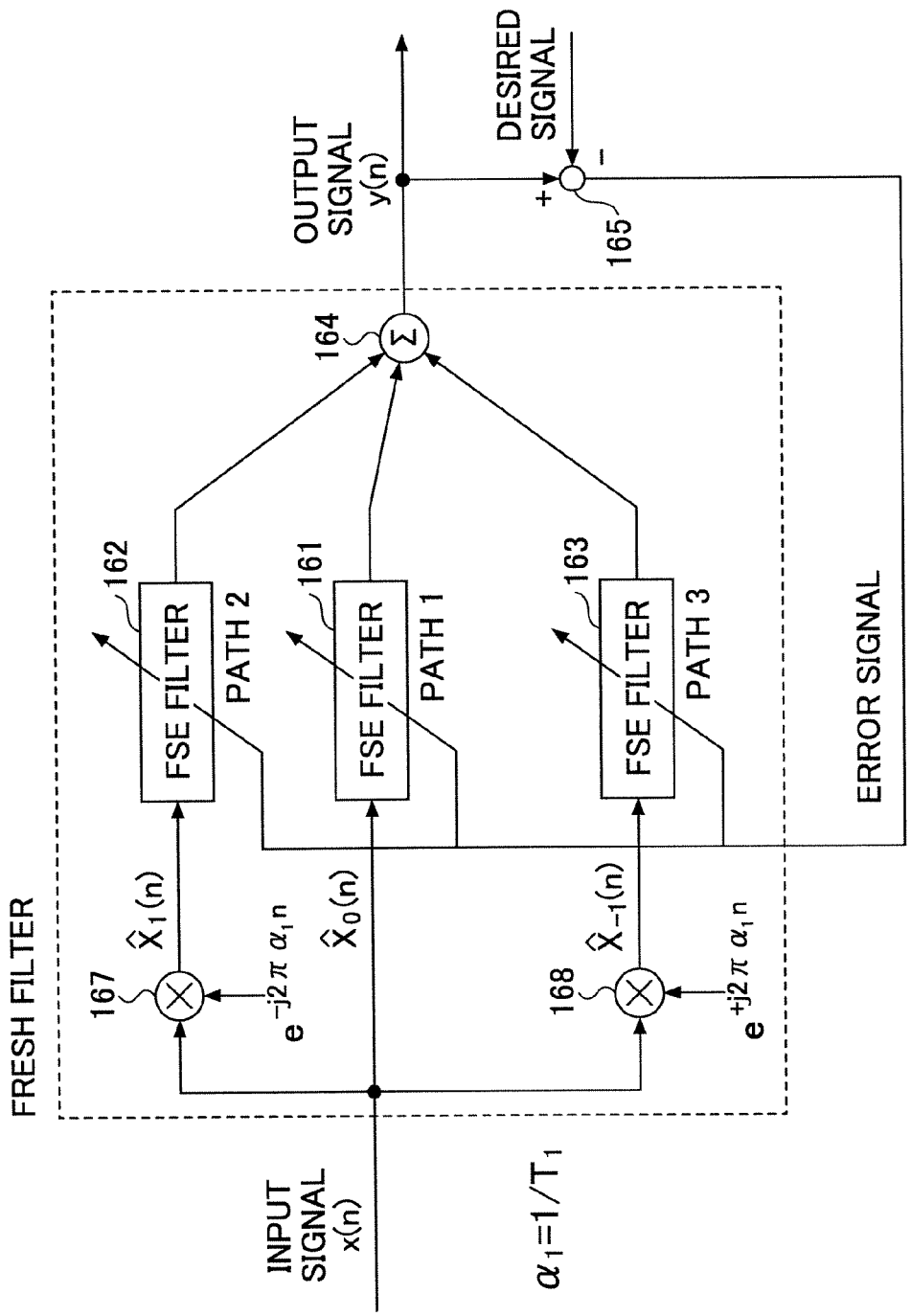
FIG. 12 is a schematic block diagram of a frequency shift (FRESH) filter according to an embodiment of the invention.

FIG. 12 illustrates an example of the frequency shift filter used in the receiver. The frequency shift filter has three branched paths, a combination unit 164 for combining the outputs from the three processing branches, and an error signal generator 165 for outputting a difference between a desired signal (e.g., a training signal) and the combination signal output from the combination unit 164. The branched paths 1, 2 and 3 have FSE filters 161, 162 and 163, respectively. Paths 2 and 3 further include phase adjustor 167 and 168, respectively, for adjusting the phase rotation. Each of the FSE filters 161, 162, and 163 has a function and a structure shown in FIG. 7. The phase adjustor 167 on Path 2 shifts the center frequency of the input signal x(t) in the negative direction by the Nyquist bandwidth ($1/T_1$). The phase adjustor 168 on Path 3 shifts the center frequency of the input signal x(t) in the positive direction by the Nyquist bandwidth ($1/T_1$).

Figure 13:
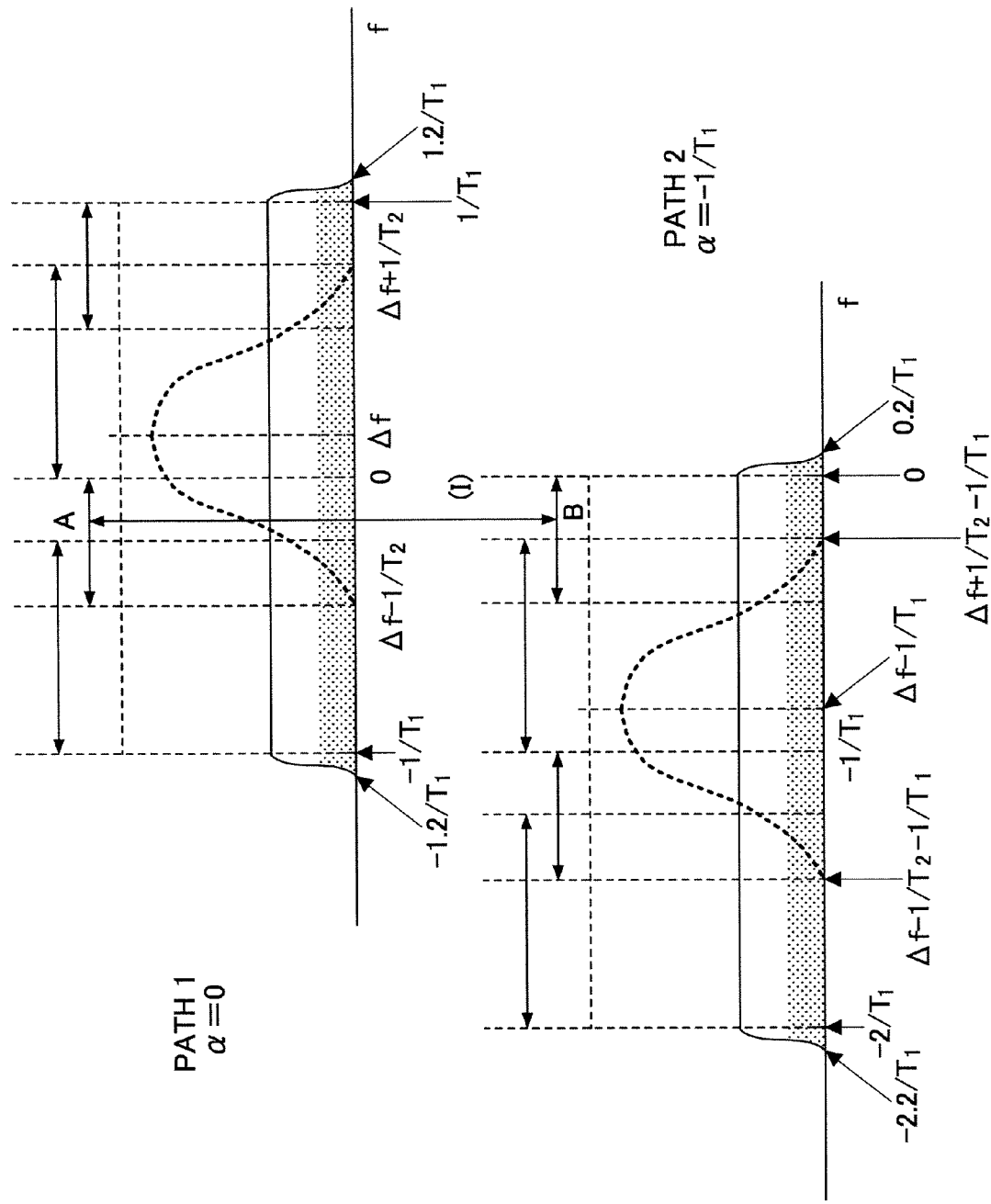
FIG. 13 illustrates the spectra of two signals before they are combined at the FRESH filter.

FIG. 13 illustrates signal spectra of Path 1 and Path 2 before they are combined. The solid waveform is pertinent to the desired signal, and the dashed waveform is pertinent to the interfering signal. Because the phase adjustor 167 on Path 2 shifts the center frequency of the input signal x(t) in the negative direction by the Nyquist bandwidth ($1/T_1$), the spectrum of Path 2 is acquired by shifting the waveforms of Path 1 in the negative direction along the frequency axis by $1/T_1$. Because the desired signal has excess bandwidth, the non-shifted desired signal has great correlation with the $1/T_1$ shifted desired signal, but correlation between the non-shifted interfering signal and the $1/T_1$ shifted interfering signal becomes small. The value $1/T_1$ is called a cycle frequency. Therefore, when the outputs from the FSE filters 161 and 162 are combined, a signal with reduced interference is produced.

Figure 14:
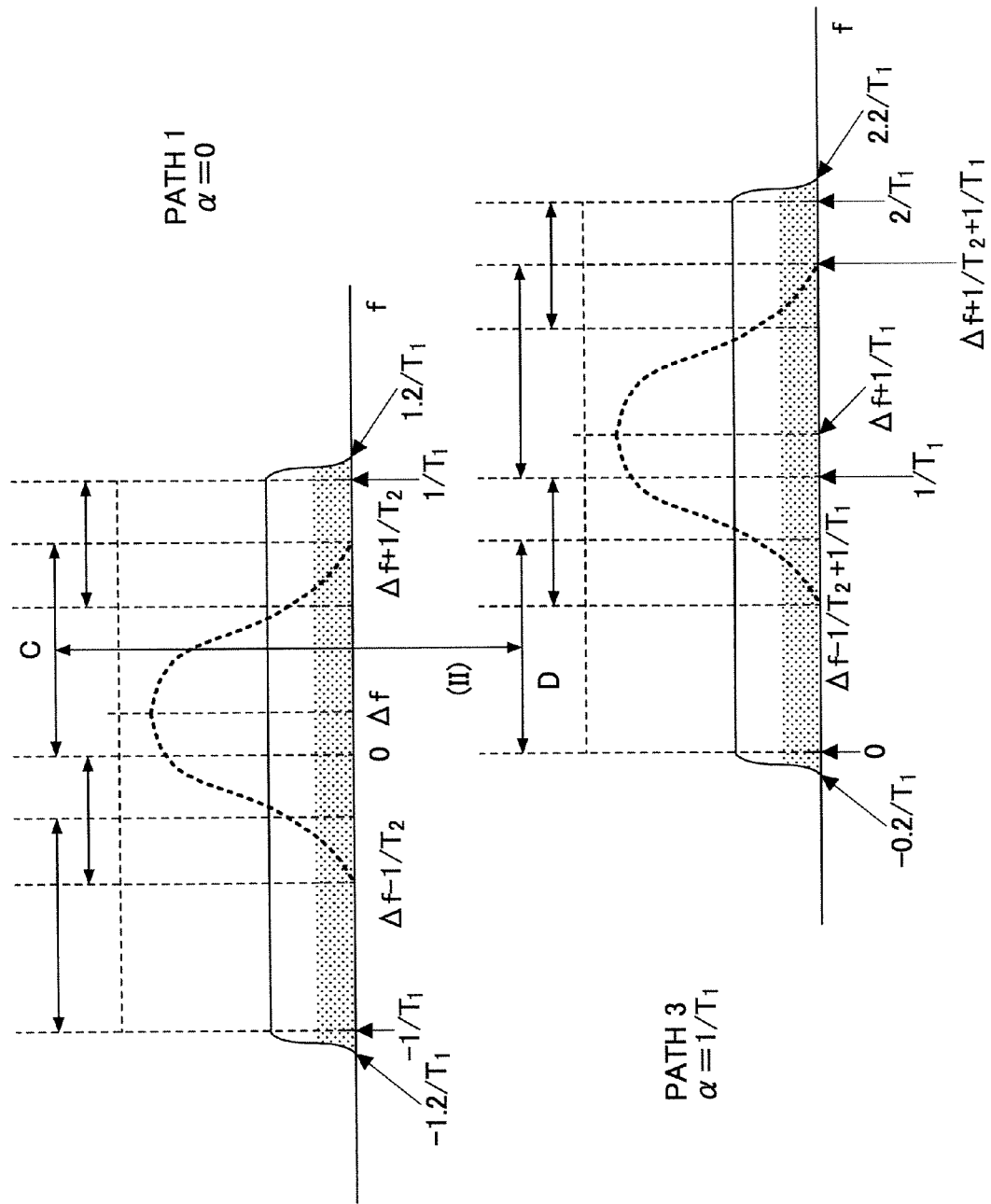
FIG. 14 illustrates the spectra of two signals before they are combined at the FRESH filter.

FIG. 14 illustrates signal spectra of Path 1 and Path 3, which figure is similar to FIG. 13. The spectrum of Path 3 is acquired by shifting the waveforms of Path 1 by $1/T_1$ in the direction opposite to Path 2. The non-shifted desired signal has great correlation with the $1/T_1$ shifted desired signal, and accordingly, the combination signal acquired from outputs of FSE filters 161 and 163 is also a signal with reduced interference.

The output of the combination unit 164 is connected to the input to the error signal generator 165. The error signal generator outputs the difference between the combination signal and the desired signal (training signal) as an error signal. The filter coefficient of each of the FSE filters 161, 162, and 163 is updated in an adaptive manner so as to minimize the error signal, and this process is repeated. If the FSE filter coefficients are controlled so as to make the output level from the error signal generator 165 sufficiently small, influence of the interfering signal can be reduced sufficiently. By making use of the excess bandwidth of the desired signal, the interfering signal can be reduced efficiently.

Figure 8:
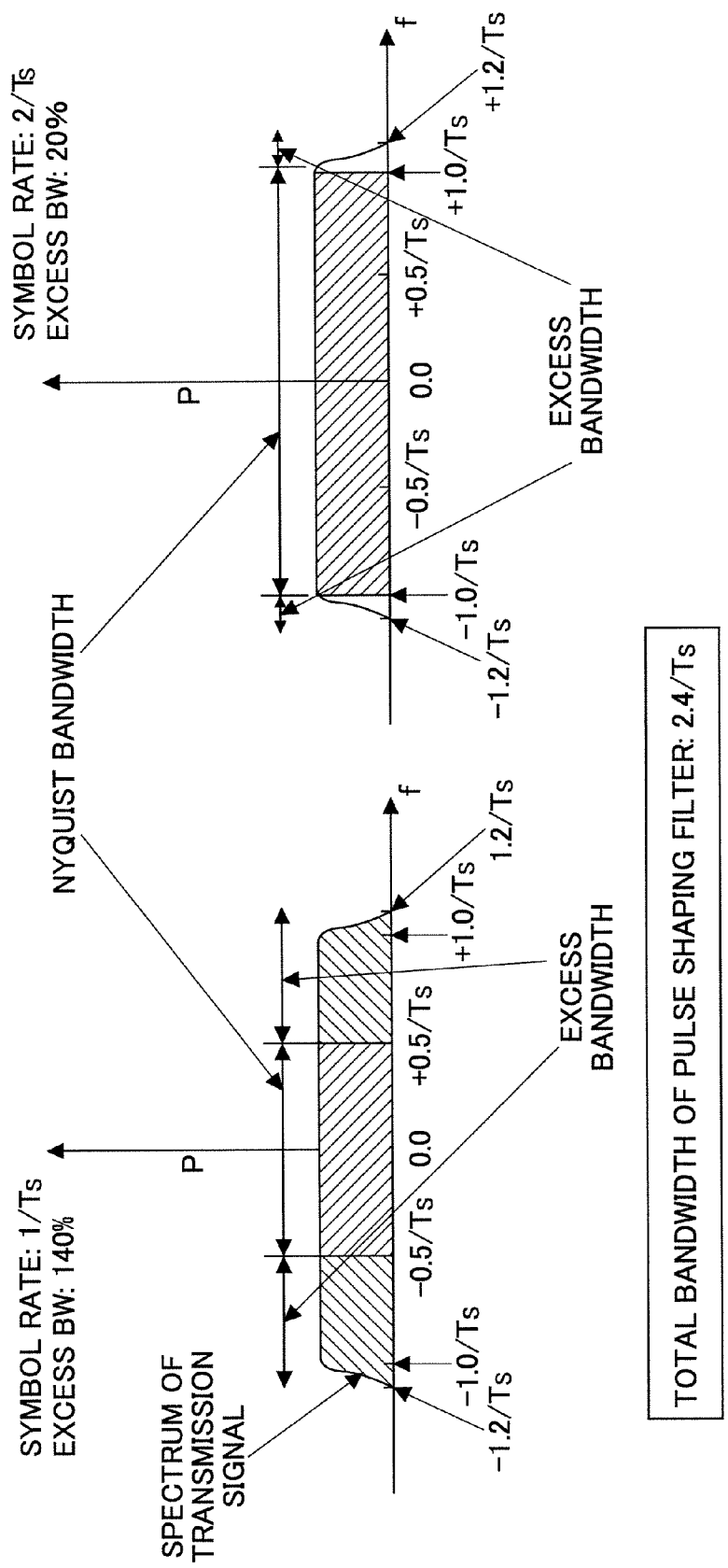
FIG. 8 is a diagram illustrating the relationship among the bandwidth of the pulse shaping filter, the Nyquist bandwidth, and the excess bandwidth.

Although in the examples shown in FIGS. 13 and 14, a pulse with excess bandwidth of 140% shown on the left-hand side of FIG. 8 is used, root-raised cosine filters or other suitable filters may be used. Any suitable type of filter can be used as long as excess bandwidth can be utilized to reduce interference from other systems. However, using the pulses illustrated in FIG. 13 and FIG. 14 is advantageous because a relatively large amplitude characteristic can be obtained, compared with the case using root-raised cosine filters, in the frequency range outside the Nyquist bandwidth, and because the correlation between Path 1 and Path 2 and correlation between Path 1 and Path 3 are so large that interference can be removed more efficiently. From this point of view, a filter having a large amplitude characteristic in the frequency range exceeding the Nyquist bandwidth ($1/T_1$) is preferable. In FIG. 12 through FIG. 14, although three branch signals with center frequencies offset from one another are combined at the combination unit 164, five branched paths may be used. In this case, two other paths are shifted in the positive and negative directions, respectively, by the cycle frequency of the interfering signal. Of course, any suitable number of branches may be used.

In this manner, the communication apparatus of the embodiment monitors the in-band interference condition and availability of adjacent channels; then parameters used in the pulse shaping filter, such as a pulse width and a pulse transmission period, are determined from the monitoring result so as to reduce the interference. Several examples are described below in conjunction with presence and absence of adjacent available channels. In each of the examples, how the parameters are determined is explained.

(1) Without Available Adjacent Channels

FIG. 15 illustrates how the excess bandwidth is adjusted if there is not an available adjacent channel when the interfering signal becomes strong. In this case, interference is reduced by decreasing the symbol rate while maintaining the pulse shaping bandwidth constant. Before the parameter adjustment, the symbol rate is 2/Ts, the pulse shaping bandwidth is 2.4/Ts, and the excess bandwidth is 20%. After the adjustment, the symbol rate is reduced to 1/Ts, the pulse shaping bandwidth is the same (that is, 2.4/Ts), and the excess bandwidth is increased to 140%. Using the excess bandwidth increased in a relative manner, interference in the received signal can be reduced. To what extent the symbol rate can be decreased depends on the traffic conditions and the service quality. From the viewpoint of reducing the interfering signal, it is desired that the Nyquist bandwidth be broader than the bandwidth of the interfering signal even after the reduction of the symbol rate.

Figure 16:
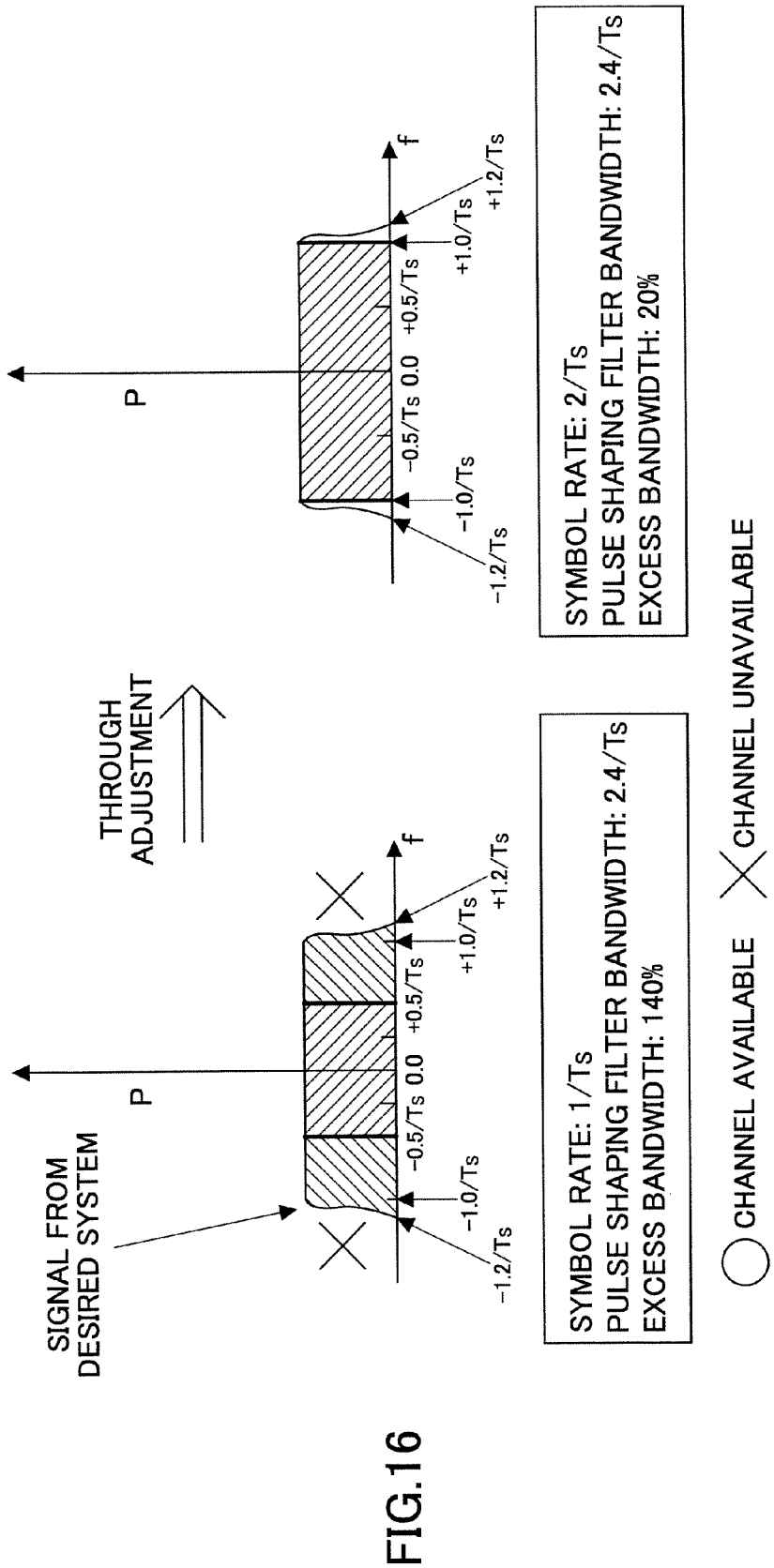
FIG. 16 illustrates how the adjusted signal is restored to the previous state when the in-band interference signal has disappeared.

FIG. 16 illustrates how the original state is restored when the in-band interference has disappeared, which procedure is opposite to FIG. 15. Because the interfering signals have disappeared, the interference reducing ability may be brought back to the low level. It is assumed that no adjacent channels are available. The symbol rate is increased to 2/Ts, the pulse shaping bandwidth is maintained at 2.4/Ts, and the excess bandwidth is reduced to 20%.

(2) With Available Adjacent Channels (Case 1)

Figure 17:
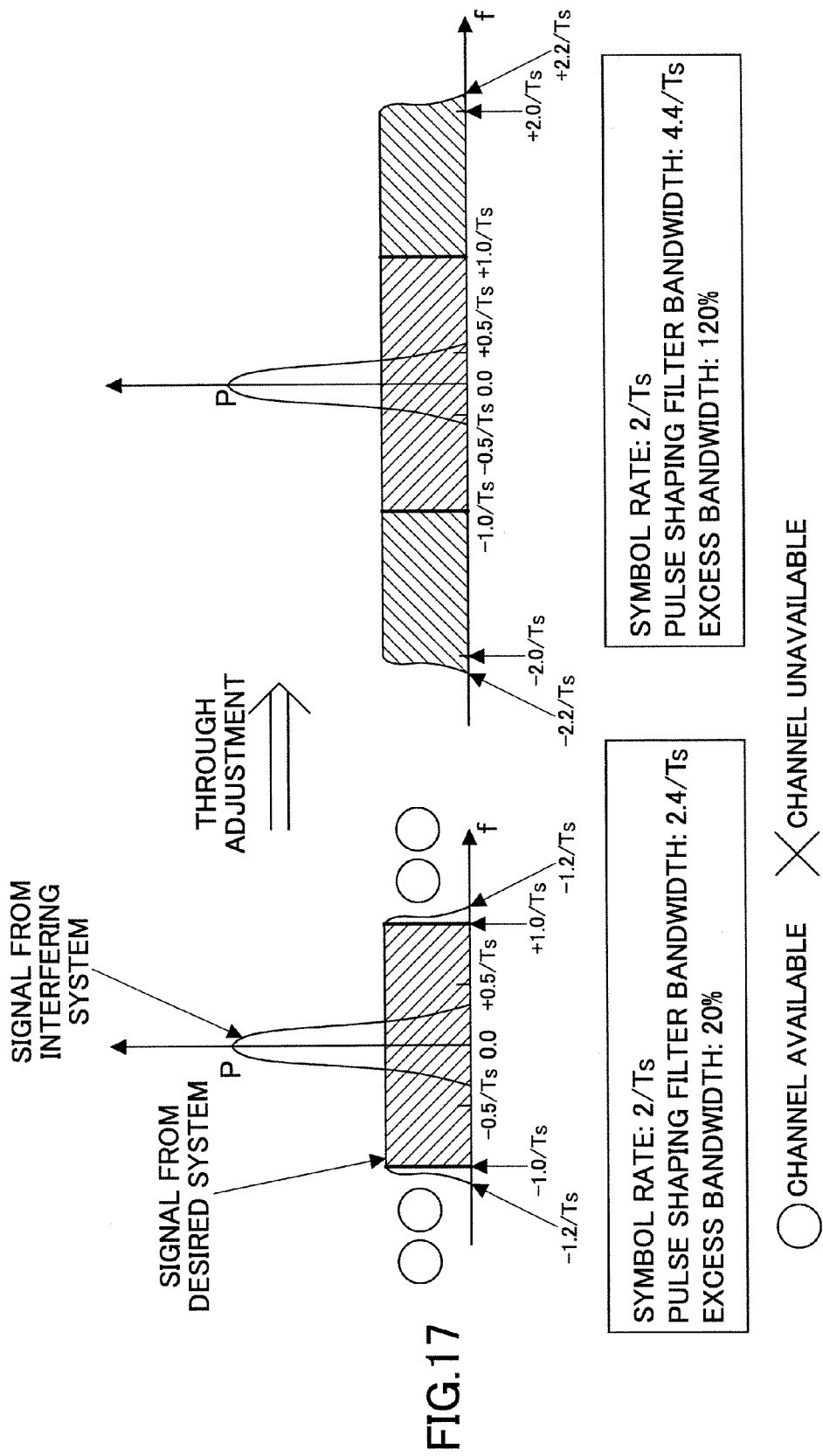
FIG. 17 illustrates how the excess bandwidth is adjusted when adjacent channels are available.

FIG. 17 illustrates a case in which there are available adjacent channels, and in which the pulse shaping bandwidth is broadened using the adjacent available channels as the excess bandwidth, while the symbol rate is maintained, when the in-band interference level becomes strong. Before the parameter adjustment, the symbol rate is 2/Ts, the pulse shaping bandwidth is 2.4/Ts, and the excess bandwidth is 20%. After the parameter adjustment, the symbol rate is maintained at 2/TS, the pulse shaping bandwidth is expanded to 4.4/Ts, and the excess bandwidth is increased to 120%. Using the excess bandwidth increased in a relative manner, interference in the received signal can be reduced. In theory, the excess bandwidth can be expanded to be as broad as the available spectrum band, and the interference reducing ability can be improved.

(3) With Available Adjacent Channels (Case 2)

Figure 18:
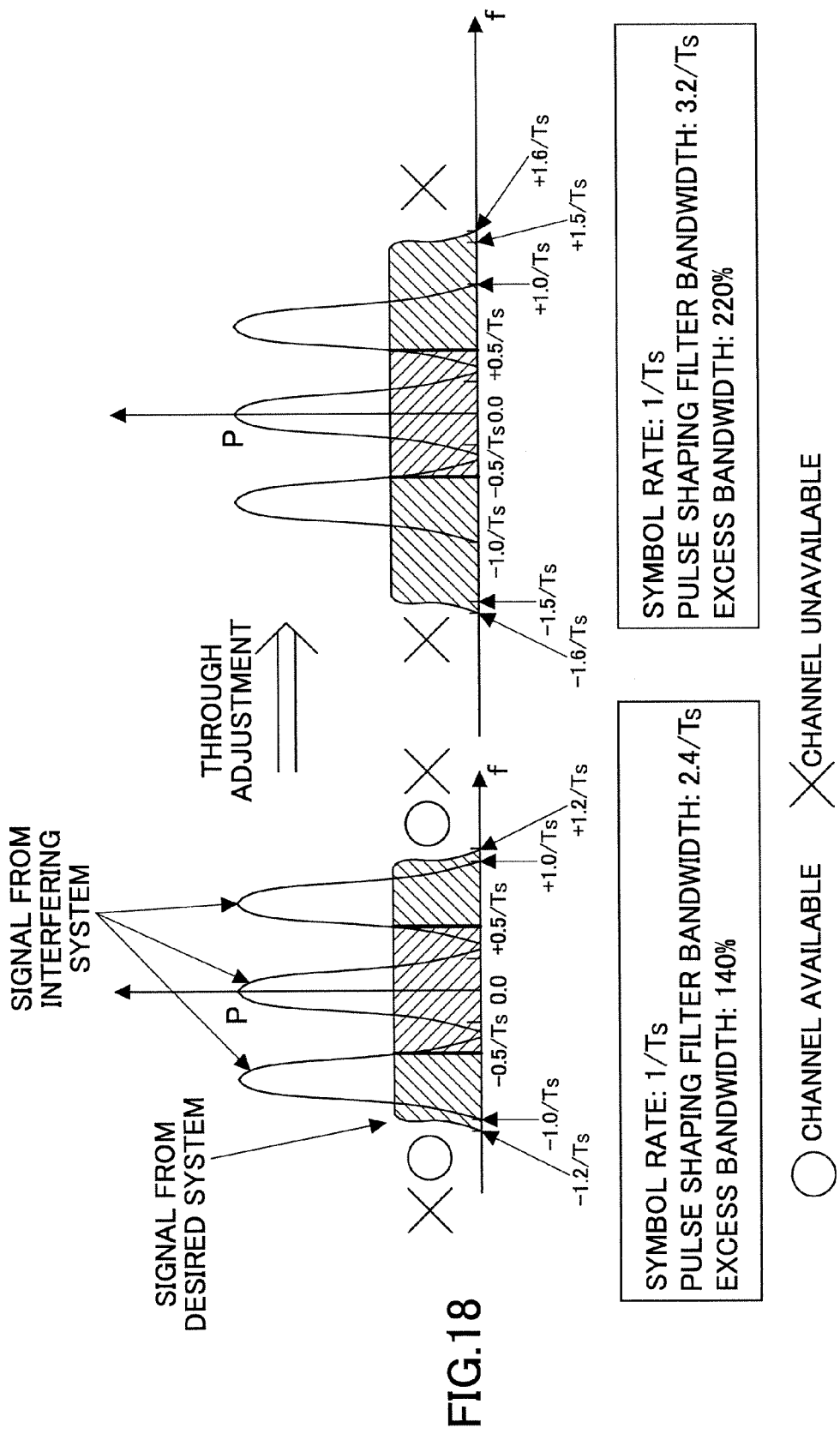
FIG. 18 illustrates another example of adjusting the excess bandwidth when adjacent channels are available.

FIG. 18 illustrates a case in which there are available adjacent channels, and in which the pulse shaping bandwidth is broadened using the adjacent available channels as the excess bandwidth, while the symbol rate is maintained, when the in-band interference level becomes strong. In this example, the bandwidth of the interfering signals is broader than the Nyquist bandwidth, and the number of available channels is less than the example of FIG. 17. The immunity against in-band interference can be improved by expanding the excess bandwidth in accordance with the available adjacent channels. After the parameter adjustment, the symbol rate is maintained at 1/Ts, the pulse shaping bandwidth is increased to 3.2/Ts, and the excess bandwidth is increased to 220%.

(4) With Available Adjacent Channels (Changing Both Symbol Rate and Pulse Shaping Bandwidth)

FIG. 19 illustrates a case in which there are available adjacent channels and in which the symbol rate is increased, while using the available adjacent channels for increasing the excess bandwidth, when the interference level becomes strong. Before the parameter adjustment, the symbol rate is 1/Ts, the pulse shaping bandwidth is 2.4/Ts, and the excess bandwidth is 140%. After the parameter adjustment, the symbol rate is increased to 2/TS, the pulse shaping bandwidth is expanded to 4.4/Ts, and the excess bandwidth is increased to 120%. With this method, the symbol rate and the interference reducing ability are improved simultaneously.

This patent application is based upon and claims the benefit of the earlier filing date of Japanese Patent Application No. 2005-360920 filed Dec. 14, 2005, the entire contents of which are hereby incorporated by reference.

What is claimed is:

1. A communication apparatus used in a spectrum sharing environment in which multiple communication systems coexist on a same spectrum band, the apparatus comprising:
   a transmission pulse shaper configured to perform bandwidth limitation of a transmit signal;
   a monitoring unit configured to monitor an in-band interference condition from co-existing multiple communication systems other than a target system to which the communication apparatus belongs, and a usage condition of adjacent channels of the target system by other communication systems;
   a controller configured to control, based on a result of the monitoring unit, at least one of a signal information bandwidth and an excess bandwidth by changing a pulse transmission period and a pulse transmission width respectively; and
   a transmission unit configured to transmit the band-limited signal of the configured controller,
   wherein the pulse transmission period is broadened, while bandwidth of the transmission pulse shaper is maintained, when in-band interference from the co-existing multiple communication systems has occurred, and no determined quantity of unused spectrum on adjacent channels is available.

2. A communication method for a communication apparatus used in a spectrum sharing environment in which multiple communication systems coexist on a same spectrum band, the communication method comprising:
   performing, at a transmission pulse shaper, bandwidth limitation of a transmit signal;
   monitoring, at a monitoring unit, an in-band interference condition from co-existing multiple communication systems other than a target system to which the communication apparatus belongs, and a usage condition of adjacent channels of the target system by other communication systems;
   controlling, at a controller of the communication apparatus and based on a result of the monitoring unit, at least one of a signal information bandwidth and an excess bandwidth by changing a pulse transmission period and a pulse transmission width respectively; and
   transmitting, at a transmission unit, the band-limited signal of the configured controller,
   wherein the pulse transmission period is broadened, while bandwidth of the transmission pulse shaper is maintained, when in-band interference from the co-existing multiple communication systems has occurred, and no determined quantity of unused spectrum on adjacent channels is available.

3. The communication method of claim 2, wherein the pulse transmission period is narrowed back, such that the signal bandwidth is increased to an upper limit, when in-band interference from the co-existing multiple communication systems becomes sufficiently decreased.

4. A communication apparatus used in a spectrum sharing environment in which multiple communication systems coexist on a same spectrum band, the apparatus comprising:
   a transmission pulse shaper configured to perform bandwidth limitation of a transmit signal;
   a monitoring unit configured to monitor an in-band interference condition from co-existing multiple communication systems other than a target system to which the communication apparatus belongs, and a usage condition of adjacent channels of the target system by other communication systems;
   a controller configured to control, based on a result of the monitoring unit, at least one of a signal information bandwidth and an excess bandwidth by changing a pulse transmission period and a pulse transmission width respectively; and
   a transmission unit configured to transmit the band-limited signal of the configured controller,
   wherein the pulse transmission period is narrowed, such that signal bandwidth is increased to an upper limit, when in-band interference from the co-existing multiple communication systems becomes sufficiently decreased.

5. A communication method for a communication apparatus used in a spectrum sharing environment in which multiple communication systems coexist on a same spectrum band, the communication method comprising:
   performing, at a transmission pulse shaper, bandwidth limitation of a transmit signal;
   monitoring, at a monitoring unit, an in-band interference condition from co-existing multiple communication systems other than a target system to which the communication apparatus belongs, and a usage condition of adjacent channels of the target system by other communication systems;
   controlling, at a controller of the communication apparatus and based on a result of the monitoring unit, at least one of a signal information bandwidth and an excess bandwidth by changing a pulse transmission period and a pulse transmission width respectively; and
   transmitting, at a transmission unit, the band-limited signal of the configured controller,
   wherein the pulse transmission period is narrowed, such that signal bandwidth is increased to an upper limit, when in-band interference from the co-existing multiple communication systems becomes sufficiently decreased.

* * * * *